United States Patent [19]

Hwang et al.

[11] Patent Number: 5,614,564
[45] Date of Patent: Mar. 25, 1997

[54] DEGRADABLE FOAM AND THE METHOD FOR ITS PRODUCTION

[75] Inventors: Jin-Taek Hwang; Seung-Ho Jeon; Won-Bum Jung; Sung-Ju Seo, all of Taejon, Rep. of Korea

[73] Assignee: Samsung General Chemicals Co., Ltd., Chungcheongnam Do, Rep. of Korea

[21] Appl. No.: 279,790

[22] Filed: Jul. 25, 1994

[30] Foreign Application Priority Data

Jul. 28, 1993 [KR] Rep. of Korea ............. 93-14436
Dec. 13, 1993 [KR] Rep. of Korea ............. 93-27507

[51] Int. Cl.$^6$ ............................. C08J 9/00; C08G 18/00
[52] U.S. Cl. ..................... 521/84.1; 521/172; 524/35; 524/72; 530/500
[58] Field of Search ................. 521/84.1, 172; 524/35, 72; 530/500

[56] References Cited

U.S. PATENT DOCUMENTS

| | | | |
|---|---|---|---|
| 5,075,417 | 12/1991 | Trowell et al. | 528/272 |
| 5,270,044 | 12/1993 | Fulmer et al. | 523/124 |
| 5,306,550 | 4/1994 | Nishiyami et al. | 524/733 |

FOREIGN PATENT DOCUMENTS

| | | |
|---|---|---|
| 5039412A | 2/1993 | Japan . |
| 2260138 | 4/1993 | United Kingdom . |

OTHER PUBLICATIONS

CA:119:10,686 (Corr. to JP–04,351,623–A2) Dec. 1992.
CA:116:154,089 (Corr. to DE 4,121,085–A1) Jan. 1992.

*Primary Examiner*—James J. Seidleck
*Assistant Examiner*—John M. Cooney, Jr.
*Attorney, Agent, or Firm*—Watson Cole Stevens Davis, PLLC

[57] ABSTRACT

The present invention relates to a lignocellulose solution and its production method, further to a degradable foam and its production method. The degradable foam of the present invention is produced by foaming and hardening with an ordinary foaming agent and hardening agent the lignocellulose solution which is obtained by dissolving lignocellulose and/or its derivatives in aliphatic polyester polyol, or else such solution with photodegradation promoters added thereto; and is also produced by foaming and hardening with an ordinary foaming agent and an ordinary hardening agent the lignocellulose solution which is obtained by dissolving lignocellulose and/or its derivatives in the bio-/photo-degradable aliphatic polyester polyol which is obtained by a polycondensation of the dicarboxylic acid composed of aliphatic dicarboxylic acid and keto containing dicarboxylic acid or its ester and aliphatic diol.

The degradable foam of the present invention excells in its degradability, mechanical properties and economic efficiency.

11 Claims, No Drawings

DEGRADABLE FOAM AND THE METHOD FOR ITS PRODUCTION

BACKGROUND OF THE INVENTION

The present invention relates to a degradable foam and the method for its production, more specifically, the present invention relates to a lignocellulose solution, with lignocellulose and/or its derivatives dissolved in aliphatic polyester polyol of low molecular weight, and the method for production of this solution; to a foam of excellent biodegradability obtained by foaming and hardening (cross-linking) said lignocellulose solution by an ordinary foaming agent and a hardening agent, and the method for production of this foam; to a foam of excellent photodegradability as well as biodegradability obtained by the same method after adding a photodegradation promoters to said solution and the method for production of this foam.

And the present invention also relates to a lignocellulose solution, with a lignocellulose and/or its derivatives dissolved in bio-/photo-degradable aliphatic polyester polyol of low molecular weight, and the method for production of this solution; and to a foam of excellent photodegradability as well as biodegradability obtained by foaming and hardening said lignocellulose solution with ordinary foaming and hardening agents.

These days waste plastic is regarded as one of the main reasons of environmental pollution, and so how to dispose of this waste plastic has been a serious problem in many countries, especially in the industrially advanced nations. Formerly waste plastic was disposed by burying, incineration, or recycling, but burying is confronting a capacity limit, while incineration is causing not merely unnecessary waste of energy, influencing unfavorable rise of the global temperatures due to generation of carbon dioxide, but also a problem in economic aspects due to damages of incinerators. Meanwhile recycling is looked upon as an ideal means and a great deal of research on it is being made, but it is still faced with much difficulty for want of cost-efficient ways of collection, quality control, standards, etc.

Especially, the polystyrene foam widely used as a disposable filler for packing is apt to be bulky and thus aggravates the shortage of burial land and incineration and recycling also have problems as has been remarked above, causing the environmental pollution. Many a country is in a hurry meeting such problems by many kinds of countermeasures, for example, application of restraints by law.

Now, therefore, brisk efforts have been made to solve the problem of the foam used as filler by making it automatically recycle to nature by means of conferring upon it a bio-/photo-degradability so that it can be degraded by the sun light or microorganisms in a certain period of time after disposal. For example, a biodegradable foam (sold under the name of NOVON), made of starch and water-soluble polymer, has been developed by a U.S. maker, NOVON PRODUCT CO. However, this product contains much starch, and so its hygroscopicity is too high, its physical properties like impact resistance are somewhat poor, and, moreover, it is not affordable for popular use. Japan's Showa High Polymer, Co., Ltd. has also succeeded in production of a synthetic biodegradable aliphatic polyester foam (sold under the name of BIONOLLE) and is in an immediate plan for its mass production, but this also is anticipated to face difficulty in a commercial aspect.

In the meantime, lignocellulose means a material including cellulose, hemicellulose, lignin etc., such as wooden powder, rice bran, straw, etc. Although these have properties of easy degradation by microorganisms in the nature and at the same time a crystalline structure contributory to desirable physical properties, they have many other problems including lack of thermoplasticity, and for these reasons they are simply discarded. Still, there is an urgant need to develop the proper ways for highly productive use of tremendous amount of these waste materials.

SUMMARY OF THE INVENTION

After strenuous efforts in research on suitable degradable foams, the present inventors have succeeded in obtaining the degradable foams of the present invention which, making the most effective use of cellulose such as waste wooden powder, rice bran and the like, can solve all the above-said problems at once by being excellent not merely in degradability but in terms of economy, and can replace those conventional disposable fillers like polystyrene foam.

The object of the present invention is to provide a new polyurethane foam excellent in its bio-degradability and photodegradability and the method for production of this new foam.

The present invention includes the degradable foam with excellent biodegradability which is obtained by foaming and hardening the lignocellulose solution with an ordinary foaming agent and hardening agent, said lignocellulose solution being obtained by dissolving lignocellulose and/or its derivatives in a biodegradable aliphatic polyester polyol of low molecular weight. The present invention also includes the foam with excellent bio-/photo-degradability which is obtained by foaming and hardening the above-said solution after further adding a photodegradation promoters to the solution.

Further the present invention includes a lignocellulose solution and the method for production thereof, said solution being obtained by dissolving lignocellulose and/or its derivatives in a bio-/photo-degradable polyester polyol of low molecular weight; and also a foam and the method for production thereof, said foam, excellent in bio-/photo-degradability, being obtained by foaming and hardening the above-said lignocellulose solution with an ordinary foaming agent and a hardening agent.

DETAILED DESCRIPTION OF THE INVENTION

Below, the present invention is described in detail:

The lignocellulose derivative in the present invention is a material that is obtained by chemical reforming reaction such as esterification, etherification, etc. of a portion of the reactive groups such as the hydroxyl groups in lignocellulose, and the method for production of this material is described in detail in Japanese laid-open patent Nos. Sho 56-135552, Sho 57-2360, Sho 57-103804, She 61-138722, Sho 61-171744, Sho 61-215675, Sho 61-215679, Sho 63-63769, etc.

To introduce the method for production of lignocellulose derivatives in brief, for instance, lignocellulose derivatives are obtained by pulverizing wooden powder in a smaller size, esterifying or etherifying the hydroxyl groups in the lignocellulose, in the presence of a solvent or swelling agent like water, at room temperature or at heating, filtering and washing with water or alcohol and finally drying.

For the esterification, are used the various acids such as acid halide dibasic acid anhydride, fatty acid or the like, and for the etherification are used such halides as methyl chloride, ethyl chloride, aryl chloride, benzyl chloride, epichlorohydrin, etc.; such α-halogen acids as monochloro acetic acid and the like; such dialkyl acetates as dimethyl acetate, diethylacetate and the like; such epoxy compounds as ethylene oxide, propylene oxide and the like; such vinyl compounds activated with an anionic group as acrylonitrile and the like; such aldehydes as diazo methane, formaldehyde and the like; and such organometallic compounds as titanium alkylate and the like. These reactions are made with or without catalysts, and in esterification such catalysts as sulfuric acid, pyridine perchlorate, zinc chloride and the like can be used, while in etherification such alkali catalysts as sodium hydroxide and the like can be used.

Good examples of organic groups to be introduced in reaction of esterification or etherification are such aliphatic acyl groups as acetyl, propionyl, butyryl, valeryl, etc.; such dibasic acid monoester groups as carboxypropenoyl, etc.; such aromatic acyl groups as benzoyl, etc.; such lower alkyl groups as methyl, ethyl, and the like; such hydroxyalkyl groups as aryl, carboxymethyl, hydroxyethyl and the like; such polyoxyalkylene glycol groups as polyoxymethylene glycol, polyoxyethylene glycol and the like; such long chain alkyl groups as benzyl, pentyl, and octyl; cyanoethyl group; methylene ether group; and others, and two or more groups of these can also be used for substitution.

Among all these mentioned above, the lignocellulose derivatives most suitable for the present invention, in view of the prices of raw material, the physical properties of the final product, and others, are the chemical reformates obtained by introduction of methyl, ethyl, benzyl, aryl, acetyl, hydroxyethyl, carboxymethyl, the monoester of maleic acid or phthalic acid, etc. to lignocellulose.

As the biodegradable aliphatic polyester polyol in the present invention, those obtained by normal condensation polymerization reaction of aliphatic dicarboxylic acid and diol and/or those obtained by the ring-opening polymerization of aliphatic cyclic ester monomers can be used.

And as the bio-/photo-degradable aliphatic polyester polyol, those obtained by ordinary condensation polymerization reaction of the dicarboxylic acid, wherein the dicarboxylic acid is composed of an aliphatic dicarboxylic acid and a keto-containing dicarboxylic acid or ester thereof and aliphatic diol can be used.

For aliphatic dicarboxylic acid, those having up to eight carbons can be used, for example, malonic acid, succinic acid, glutaric acid, adipic acid, pimelic acid, suberic acid, azelaic acid, sebacic acid, and their methyl and ethyl derivatives can be used.

For keto containing dicarboxylic acid or its ester, those containing ketonic group and aliphatic chain of up to eight carbons, namely, for example, acetyl succinic acid, β-acetyl glutaric acid, γ-acetyl pimelic acid, γ-benzoyl pimelic acid, γ-acetyl suberic acid, γ-acetyl azelaic acid, 3-oxoglutaric acid, and their methyl and ethyl derivatives can be used.

For diol, such diol as having up to than eight carbons, that is, for example, ethylene glycol, propylene glycol, 1,4-tetramethylene glycol, 1,5-pentamethylene glycol, 1,6-hexamethylene glycol, 1,6-heptamethylene glycol, 1,8-octamethylene glycol, diethylene glycol, triethylene glycol, and others can be used.

For aliphatic cyclic ester monomer, what can perform ring-opening reaction in commonly known ways is suitable, namely, for example, β-propiolactone, β-butyrolactone, α,α'-bischloromethyl propiolactone, α,α'-dimethyl-β-propiolactone, δ-valerolactone, β-ethyl-δ-valerolactone, 3,4,5-trimethoxy-δ-valerolactone, 1,4-dioxane-2-one, glycolide, lactide, 1,4-dithiane-2,5-dione, trimethylene carbonate, neopentylene carbonate, ethylene oxalate, propylene oxalate, ε-caprolactone, γ-methyl-ε-caprolactone, β-methyl-ε-caprolactone, γ-methyl-ε-caprolactone, 4-methyl-7-isopropyl-ε-caprolactone, 3,3,5-trimethyl-ε-caprolactone, cis-disalicylide, trisalicylide and others can be used, but in the economic view ε-caprolactone, lactide, glycolide, etc. are the most suitable.

In producing the aliphatic polyester polyol, the amount of the dicarboxylic acid composed of aliphatic dicarboxylic acid and keto containing dicaboxylic acid or its ester to be added is desired to exceed that of the aliphatic diol in mol, say, within the range of 5~20 mol %. This is because it is desired to obtain such polyol as having hydroxyl groups linked at the end of the polymerized polyester.

In production of the bio-/photo-degradable aliphatic polyester polyol, if the content of the keto containing dicarboxylic acid or its ester in the total dicarboxylic acid is less than 0.01 mol %, the photodegradability of the polyester polyol becomes poor, while in case that it is more than 5.0 mol % the economical efficiency decreases because the keto containing dicarboxylic acid is expensive. Thus, the content of the keto containing dicarboxylic acid or its ester is most preferable to be within the range of 0.3~2mol % in consideration of photodegradability and economic aspects.

The molecular weight of the aliphatic polyester polyol is desirable to be within the range of 200 to 5,000, more preferably being within the range of 300 to 2,000. In case the molecular weight of the polyol is below 200, it is advantageous in terms of the dissolution of lignocellulose and/or its derivatives, but the photodegradability of the final foam gets less good because of the higher degree of hardening, that is, higher cross-linking density in the case of using hardening agent. While in case the molecular weight of the polyol is over 5,000, the dissolution of lignocellulose and its derivatives does not take place well enough.

The solution obtained in the present invention by dissolution of lignocellulose and/or its derivatives in aliphatic polyester polyol is usually obtained by mixing of aliphatic polyester polyol in 10 to 1,000 parts by weight and lignocellulose and/or its derivatives in 100 parts by weight and by heating-and-stirring for 0.5 or 5 hours. In case the amount of added aliphatic polyester polyol is less than 10 parts by weight sufficient dissolution is not fulfiled, and the physical properties of the final foam gets inferior, while in case the amount of polyol is over 1,000 parts by weight the total economic efficiency proves less preferable because of the very high prices of aliphatic polyester polyol. To solve this sort of problem it is occasionally possible to add some adequate quantity of such cheaper polyols as, for example, polyhydric alcohol of lower molecular weight like ethylene glycol, propylene glycol, etc. or such polyether polyols as polyethylene glycol, polypropylene glycol, etc. In this case, however, the attention must be paid because excess addition of polyol may yield a final foam of poor biodegradability.

In the heating the range of 100° to 300° C. is normally regarded as adequate, 200° to 300° C. being the most suitable. The higher the temperatures the better the dissolution gets, but if the temperature exceeds 300° C., it is not advisable since lignocellulose and its derivatives tend to get carbonized. To accelerate the dissolution a small quantity of hydrochloric acid, sulfuric acid, lewis acid, or other acid catalysts can be added, but in this case, if laid alone, an unstability of the solution, such as a recondensation of lignin, may result, and so it is advisable to neutralize the solution by alkali or to remove the precipitates after producing double salt.

The foam of the present invention is obtained by foaming and hardening the lignocellulose solution of lignocellulose and/or its derivatives in biodegradable aliphatic polyester polyol with ordinary foaming and hardening agents.

As a hardening agent, such polyhydric isocyanate compounds as, for example, methylene diphenyl diisocyanate (MDI), tolylene diisocyanate (TDI), etc.; polyhydric glycidyl compounds; melamine derivatives and others can be used.

As the foaming agent, such solvents of low boiling point as cyclopentane, hexane, freon, substitute freon, etc., or water can be used, but it is the best to use water as the foaming agent in view of the current serious problem of pollution by freon and the like.

For improvements of the physical properties of the foam, use of a surfactant is advisable, and in this connection the surfactant made of silicone compound which has been used for conventional polyurethane foams is the most suitable. For acceleration of the foaming and hardening, use of ordinary amine or tin catalysts is also recommendable.

The quantities of the foaming agent, surfactant, and catalysts to be added in production of the foam are to be 5 to 50 parts by weight, 0.1 to 2.0 parts by weight, and 0.1 to 2.0 parts by weight, respectively, to 100 parts by weight of lignocellulose solution, and the hardening agent is desirable to be added by 60 to 150 parts by weight to 100 parts by weight of the solution containing the above-said additives.

The foam obtained by the above-said method is excellent not merely in its biodegradability but in its economic efficiency.

In addition to the above-said biodegradable foam, a foam having an excellent bio-/photo-degradability is also obtained in the present invention, this latter being obtained by adding photodegradation promoters to the solution of lignocellulose and/or its derivatives in biodegradable aliphatic polyester polyol and by foaming and hardening the solution with ordinary foaming and hardening agent.

The photodegradation promoters used in the present invention are disclosed in U.S. Pat. Nos. 3,797,690, 3,860,538, 4,121,025, 4,461,853, 3,676,401, 2,495,286, and 3,083,184, and Japanese patent laid-open Nos. Sho 48-54153, Sho 50-21079, Sho 50-34340, etc., that is, for example, the condensation products of aldol and α-naphthyl amine; acetyl acetone; such metal dialkyl-dithiocarbamates as cobalt dimethyl-dithiocarbamate; salycilaldehyde; α-mercaptobenzothiazole; copper acetate; such metallic salts of fatty acid as zinc stearate and others; thio dipropionic acid; such metal acetylacetonate as ferric acetylacetonate, cobalt acetylacetonate and others; α-naphthoquinone, anthraquinone and their derivatives; propiophenone, benzophenone and their derivatives; vinyl-ketone copolymer (Ecolyte Atlantic's ECO-LYTE); ethylenecarbon monoxide copolymer (Union Carbide's DXM-439); etc., and use of two or more of those mentioned above is desirable.

The quantity of photodegradation promoters may vary according to their types, but ordinarily a range of 0.001 to 5 parts by weight is adequate to 100 parts by weight of the solution of lignocellulose and/or its derivatives in the aliphatic polyester polyol, a range of 0.01 to 3 parts by weight is the most suitable. In case the quantity of photodegradation promoters is less than 0.001 parts by weight the desired photodegradability can not be obtained, and in case it exceeds 10 parts by weight the photodegradability is good but the mechanical properties become less good, not to say of the poor economic efficiency on account of their high prices.

In the present invention excellent bio-/photo-degradable foam is also obtained by producing a solution of lignocellulose and/or its derivatives in a bio-/photo-degradable aliphatic polyester polyol which obtained by condensation polymerization reaction of the dicarboxylic acid composed of aliphatic dicarboxylic acid and keto containing dicarboxylic acid or its ester with aliphatic diol, then foaming and hardening the solution with a foaming agent and a hardening agent.

As has been described above, the foam of the present invention is excellent not merely in its physical property but in its economic efficiency, thanks to the use of waste resource, and at the same time because it is easily degraded by the sun light and microorganisms it is a truly epoch-making product free of any fear of causing environment pollution.

EXAMPLES

A further detailed description of the present invention is given below making reference to examples of embodiment, but the present invention is not of course limited or confined to these examples. The methods for measurement of the physical properties of a foam in the examples follows:

Density

A sample of the foam larger than 1000 mm$^3$ in volume was made, and its density was measured by the ASTM D 3574 method.

Hardness (25% ILD)

A sample larger than 380×380×20mm in size was made, and its 25% ILD (indentation load deflection value) was measured.

Biodegradability

After the sample was cut to a certain size, a suspension of those fungal spores, widely found in the soil, of *Aspergillus niger, Aspergillus flayus, Penicillium funiculosum,* and *Pullularia pullulans,* was spread on cut samples using agar medium to measure the extent of covering by mold for determination of the biodegradability as follows:

No growth (0%): 0
Below 10%: 1
10~30%: 2
30~60%: 3
60~100%: 4

Photodegradability

After the sample was cut to a certain size, it was set in a weather-o-meter (Atalas's Ci65A) and laid under a Xenon arc to measure the time required for it to show a hardness of 5% or less of the original hardness.

Examples 1~5

(1) Preparation of a Solution of Wooden Powder in Polycaprolactone

A solution of wooden powder, which was a form of lignocellulose, in polycaprolactone, which was a form of aliphatic polyester, was prepared. 100 parts by weight of wooden powder of 20 meshes to 80 meshes, dried at 100° C. for more than ten hours, and 400 parts by weight of polycaprolactone (Union Carbide's TONE POLYOL) of various molecular weights were taken inside autoclave for polymerizaton, which was then sealed tight for heating and stirring at 250° C. for two and a half hours, and thus a brown viscous solution of about 1,000 cP was obtained.

(2) Production of a Foam

To 100 parts by weight of the solution, as obtained in (1) above, 10 parts by weight of water as a foaming agent and 1.5 parts by weight of L-5740M as surfactant made of silicone compouond (U.S. Union Carbide's product) were added and well mixed, and after that 0.3 parts by weight of amine catalyst (U.S. Aldrich's DABCO 33LV) and 0.3 parts by weight of tin catalyst (tin octoate) were added and well stirred and then to this solution 105 parts by weight of the hardening agent, MDI, was added and well stirred, which was heated to 50° C. After two or three minutes the foaming and hardening were completed and a ductile degradable foam was obtained. Its resultant physical properties are shown in Table 1.

was added and this was stirred at a room temperature and was micellized. Then, 60 ml of methyl iodide was added to it, the container sealed tight, and heated to 80° C. for 3 to 6 hours. Upon completion of reaction, the stirrer was halted, and then the solution became separated into two layers, the toluene of the upper layer was decanted and removed, and a mixture of acetic acid in acetone/methanol (3:7 in ratio of volume) was added, and the whole was stirred, and after the supernatant was removed, the excess acetone was further stirred, and after washed and filtered twice it was dried using a convectional drying oven at 60° C. for a day, and then was finally vacuum dried at 50° C. to obtain the desired sample. The methylated wood, thus obtained, was solid powder of yellow with an orange tint, and its increase rate in weight was 10%.

(2) Preparation of a Solution of Methylated Wood in Polycaprolactone 100 parts by weight of the methylated wood obtained in the above (1) and 400 parts by weight of polycaprolactone of various molecular weights were taken in an autoclave for polymerization and after the container was sealed tight, the contents were stirred and heated to 230° C. for 3 hours to obtain a thick brown viscous solution.

TABLE 1

| Item Example | Composition of solution (parts by weight) wooden/powder polycaprolactone | Molecular weight of polycaprolactone | Density (kg/m$^3$) | Hardness (25%, ILD) (Kef/cm$^2$) | Biodegradability | Photodegradability (hr) |
|---|---|---|---|---|---|---|
| 1 | 100/400 | 425 | 50.2 | 17.3 | 4 | 1,900 |
| 2 | 100/400 | 530 | 49.8 | 16.9 | 4 | 2,000 |
| 3 | 100/400 | 830 | 45.1 | 15.8 | 4 | 2,100 |
| 4 | 100/400 | 1,000 | 43.7 | 15.4 | 4 | 1,950 |
| 5 | 100/400 | 2,000 | 41.5 | 14.9 | 4 | 2,200 |

Examples 6~10

(1) Preparation of Methylated Wood

As an example of lignocellulose derivatives, methylated wood was prepared.

At first, 50 g of dried wooden powder of Radiata pine-tree (20 to 60 meshes) was put in a 1 l flask, and 500 g of toluene was added. Next, 40 g of sodium hydroxide (40% solution)

(3) Production of a Foam

To the solution obtained in the above (2) hardening agent, foaming agent, surfactant, and catalyst were added, as in Examples 1 to 5, and through mixing, foaming and hardening a ductile degradable foam was obtained. The resultant physical properties of this foam are given in Table 2 below:

TABLE 2

| Item Example | Composition of solution (parts by weight) wooden/powder polycaprolactone | Molecular weight of polycaprolactone | Density (kg/m$^3$) | Hardness (25%, ILD) (Kgf/cm$^2$) | Biodegradability | Photodegradability (hr) |
|---|---|---|---|---|---|---|
| 6 | 100/400 | 425 | 51.4 | 17.1 | 4 | 1,800 |
| 7 | 100/400 | 530 | 48.2 | 16.9 | 4 | 1,900 |
| 8 | 100/400 | 830 | 43.1 | 15.5 | 4 | 2,000 |
| 9 | 100/400 | 1,000 | 41.7 | 15.0 | 4 | 2,050 |
| 10 | 100/400 | 2,000 | 39.5 | 14.5 | 4 | 2,100 |

Examples 11~15

(1) Preparation of Acetylated Wood

As another example of lignocellulose derivatives, acetylated wood was prepared. To 10 g of dried wooden powder of tropical Keruing wood were added 6.0 ml of acetic anhydride and 40.0 ml of acetic acid and it was laid alone at room temperature over a night. Next, an acylating agent of a mixture of 100 ml of acetic anhydride, 60.0 ml of acetic acid and 0.2 ml of perchloric acid was cooled at about −10° C., and this was added to pre-treated wooden powder. The mixture was put in a 300 ml three-necked round bottom flask and laid alone at room temperature for an hour, and then was stirred at 30° C. to 45° C. for six hours. After that it was washed with water, filtered through a glass filter, and was made into acetylated wood by the same method used in the preparation of the above-said methylated wood. The resultant acetylated wood was in the same color as the wood used. The 60% weight increase occured.

(2) Preparation of Polyhexamethylene Succinate

Polyhexamethylene succinate, one of aliphatic polyesters, was prepared.

A mixture of 1,6-hexane diol and succinic acid in mol ratio of 1.02:1, and titanium propoxide as much as 0.5 weight % of the total were put in a three-necked round bottom flask, stirred and heated slowly to 160° C. for two hours, and then making use of an aspirator the water produced during the esterification was removed in vacuum, and the reaction time was adjusted within the range of 2 to 5 hours to obtain polyhexamethylene succinates of various molecular weights (See Table 3).

(3) Preparation of a Solution of Acetylated Wood in Polyhexamethylene Succinate A solution was prepared using the acetylated wood and polyhexamethylene succinate, obtained in the above (1) and (2).

100 parts by weight of acetylated wood and 400 parts by weight of polyhexametylene succinate of various molecular weights were taken in an autoclave for polymerization, sealed tight, and stirred while getting heated to 200° C. for two hours, whereupon a brown, viscous solution was obtained.

(4) Production of a Foam

To the solution obtained in the above (3) were added a hardening agent, foaming agent, surfactant, and catalyst of the same composition as those used in Examples 1~5 above, and then all were mixed well, foamed and hardened, whereupon a ductile degradable foam was obtained. Its resultant physical properties are given below in Table 3.

TABLE 3

| Item Example | Composition of solution (parts by weight) Acetylated wood/ polyhexamethylene succinate | Molecualar weight of polyhexa- methylene succinate | Density $(kg/m^3)$ | Hardness (25%, ILD) $(Kgf/cm^2)$ | Biodegradability | Photodegradability (hr) |
|---|---|---|---|---|---|---|
| 11 | 100/400 | 500 | 49.2 | 17.0 | 4 | 1,900 |
| 12 | 100/400 | 650 | 45.2 | 16.4 | 4 | 1,950 |
| 13 | 100/400 | 900 | 41.3 | 15.1 | 4 | 2,000 |
| 14 | 100/400 | 1,300 | 40.4 | 14.6 | 4 | 2,100 |
| 15 | 100/400 | 2,500 | 38.7 | 14.1 | 4 | 2,050 |

Examples 16~20

(1) Preparation of a Solution of Wooden Powder and Photodegradation Promoter in Polycaprolactone A bio-/photo-degradable solution was prepared by adding various photodegradation promoters to a solution obtained in Example 1 (wooden powder and polycaprolactone (molecular weight: 425) in a ratio of 100 to 400 parts by weight). The photodegradation promoters used here were ferric acetylacetonate, cobalt stearate, and salicylaldehyde.

(2) Production of a Foam

To the solution obtained in the above (1) were added the hardening agent, foaming agent, and catalyst of the same composition as in Examples 1~5, and by mixing them well, foaming and hardening the mixture, a ductile degradable foam was obtained, whose resultant physical properties follow in Table 4:

TABLE 4

| Item Example | Composition of solution (parts by weight) wooden powder/ polycaprolactone/ photodegradation promoter | Kind of photodegradation promoter | Density $(kg/m^3)$ | Hardness (25%, ILD) $(Kgf/cm^2)$ | Biodegradability | Photodegradability (hr) |
|---|---|---|---|---|---|---|
| 16 | 200/800/5 | ferric acetyl- acetonate | 50.7 | 17.4 | 4 | 200 |

TABLE 4-continued

| Item Example | Composition of solution (parts by weight) wooden powder/ polycaprolactone/ photodegradation promoter | Kind of photodegradation promoter | Density (kg/m$^3$) | Hardness (25%, ILD) (Kgf/cm$^2$) | Biodegradability | Photodegradability (hr) |
|---|---|---|---|---|---|---|
| 17 | 200/800/10 | ferric acetyl-acetonate | 51.2 | 17.6 | 4 | 150 |
| 18 | 200/800/15 | ferric acetyl-acetonate | 51.9 | 17.9 | 4 | 70 |
| 19 | 200/800/15 | cobalt stearate | 52.5 | 18.2 | 4 | 65 |
| 20 | 200/800/15 | salicyl aldehyde | 53.1 | 18.5 | 4 | 95 |

Examples 21~25

(1) Preparation of Bio-/photo-degradable Aliphatic Polyester Polyol 2.49 moles adipic acid, 0.015 moles of acetyl succinate, and 2.63 moles of diethylene glycol were put in a 1 l autoclave equipped with distillation head, and this mixture was heated to 150° C. and stirred under atmosphere of nitrogen for an hour, and then as the catalyst titanium propoxide in an amount of about 0.5 weight % of the total was added, again the mixture was slowly heated and stirred, and after a reaction at 170° C. for four hours, the desired aliphatic polyester was obtained. Also while changing the kinds of glycol, dicarboxylic acid, and keto containing dicarboxylic acid, bio-/photodegradable aliphatic polyesters of various molecular weights (See Table 5) were obtained.

(2) Preparation of a Solution of Wooden Powder in Bio-/photo-degradable Aliphatic Polyester Polyol of Low Molecular Weight A solution was produced of wooden powder, which is one form of lignocellulose, in the bio-/photo-degradable aliphatic polyester polyols, which were produced in (1) above. 100 parts by weight of wooden powder of 20 to 90 meshes, dried at 110° C. for more than 10 hours, and 400 parts by weight of the aliphatic polyester, produced in (1) above, were placed together in an autoclave for polymerization, the container sealed tight, stirred while getting heated to 250° C. for three hours, and thus a brown, viscous solution of about 2,000 cP was obtained.

(3) Production of a Foam

To 100 parts by weight of the solution obtained in (2) above were added parts by weight of water as a foaming agent and 1.0 parts by weight of L-580 (U.S. Union Carbide's), a surfactant made of silicone compound, these well mixed, and then again 0.5 parts by weight of DABCO 33LV (U.S. Aldrich's), an amine catalyst, and 0.5 parts by weight of dibutyltin dilaurate, a tin catalyst, were added to the above mixture, and then 100 parts by weight of the hardening agent, MDI, was added to this well mixed solution, the whole was again well mixed. After completion of the foaming in about two or three minutes a ductile degradable foam was obtained, the resultant physical properties of which indicated in the following Table 6:

TABLE 5

| Sample | Composition | | | Physical properties | | |
|---|---|---|---|---|---|---|
| | glycol (mol) | dicarboxylic acid (mol) | keto containing dicarboxylic acid (mol) | Tm (°C.) | molecular weight | OH value mg KOH/g |
| sample 1 | diethylene glycol 2.63 | adipic acid 2.49 | acetyl succinic acid 0.015 | −29 | 2,000 | 26.0 ~ 60.0 |
| sample 2 | triethylene glycol 2.63 | adipic acid 2.49 | acetyl succinic acid 0.015 | −39 | 2,400 | 53.0 ~ 57.0 |
| sample 3 | diethylene glycol 2.63 | succinic acid 2.49 | β-acetyl glutaric acid 0.015 | −11 | 1,800 | 55.0 ~ 59.0 |
| sample 4 | diethylene glycol 2.63 | succinic acid 2.49 | 3-oxoglutaric acid 0.015 | −09 | 1,900 | 52.0 ~ 56.0 |
| sample 5 | propylene glycol 2.63 | succinic acid 2.49 | acetyl succinic acid 0.015 | −10 | 2,200 | 54.0 ~ 58.0 |

TABLE 6

| Item Example | Composition of solution (parts by weight) wooden powder/ aliphatic polyester | Aliphatic polyester | Density (kg/m$^3$) | Hardness (25%, ILD) (Kgf/cm$^2$) | Biodegradability | Photodegradability (hr) |
|---|---|---|---|---|---|---|
| 21 | 100/400 | sample 1 | 10.2 | 20.1 | 4 | 200 |
| 22 | 100/400 | sample 2 | 8.8 | 17.7 | 4 | 200 |
| 23 | 100/400 | sample 3 | 11.8 | 21.3 | 4 | 300 |
| 24 | 100/400 | sample 4 | 10.5 | 20.6 | 4 | 250 |
| 25 | 100/400 | sample 5 | 9.5 | 18.9 | 4 | 350 |

Examples 26–30

(1) Preparation of a Solution of Rice Bran in Bio-/photo-degradable Aliphatic Polyester of Low Molecular Weight A solution was produced of rice bran, one form of lignocellulose, and samples 1~5 of bio-/photo-degradable polyester.

100 parts by weight of rice bran of 20 to 80 meshes dried at 110° C. for more than 10 hours and 400 parts by weight of samples 1~5 were put in an autoclave for polymerization and stirred while getting heated to 250° C. for more than three hours to obtain a brown, viscous solution of about 2,000 cP.

(2) Production of a Foam

To 100 parts by weight of the solution obtained in (1) above were added 30 parts by weight of water as the foaming agent and 1.0 parts by weight of a surfactant made of silicone compound, L-580 (U.S. Carbide's), and then this whole was well mixed, and 0.5 parts by weight of the amine catalyst, DABCO LV (U.S. Aldrich's), and 0.5 parts by weight of the tin catalyst, dibutyltin dilaurate, were added, and after mixing all these well, 130 parts by weight of MDI as the hardening agent was further added to the mixed solution, then in about two to three minutes the foaming and hardening completed to obtain a ductile degradable foam, whose resultant physical properties are given in the following Table 7.

mixture was stirred while getting heated to 230° C. for 3 hours to obtain a thick brown viscous solution. To this solution were added the hardening agent, foaming agent, surfactant, and catalyst of the same composition as those used in Examples 1~5 above, and this mixture was well stirred up, foamed, and hardened to obtain a ductile degradable foam, whose resultant physical properties are given in Table 8 below:

Comparative Examples 3~5

To polyether polyol (sold by Korea Polyol, Ltd. as KONIX PP-2,000, GP-3,000, FA-703), instead of the solution of lignocellulose and/or its derivatives in polyester polyol, were added the hardening agent, foaming agent, surfactant, and catalyst of the same composition as those used in Examples 1~5 above, and this mixture was well

TABLE 7

| Item Example | Composition of solution (parts by weight) rice bran/ aliphatic polyester | Aliphatic polyester | Density (kg/m$^3$) | Hardness (25%, ILD) (Kgf/cm$^2$) | Biodegradability | Photodegradability (hr) |
|---|---|---|---|---|---|---|
| 26 | 100/400 | sample 1 | 10.3 | 20.2 | 4 | 250 |
| 27 | 100/400 | sample 2 | 8.9 | 17.8 | 4 | 270 |
| 28 | 100/400 | sample 3 | 11.9 | 21.4 | 4 | 300 |
| 29 | 100/400 | sample 4 | 10.6 | 20.6 | 4 | 220 |
| 30 | 100/400 | sample 5 | 9.6 | 19.0 | 4 | 300 |

Comparative Examples 1~2

100 parts by weight of the wooden powder used in Example (1) above and parts by weight of the polycaprolactone of 150 and 6,000 molecular weights were put in autoclave for polymerization and it was sealed and this stirred, foamed, and hardened to obtain a ductile and semihard polyurethane foams known to be better in biodegradability than ordinary polystyrene foam. The resultant physical properties of these polyurethane foams are also given in Table 8 below:

TABLE 8

| Item comp. Example | Kinds of solution and polyol | Density (kg/m³) | Hardness (25%, ILD) (kgf/cm²) | Biodegradability | Photodegradability (hr) |
|---|---|---|---|---|---|
| 1 | wooden powder/ polycaprolactone (M.W. 150) | 121.3 | — | 2 | 2,500 |
| 2 | wooden powder/ polycaprolactone (M.W. 6,000) | 90.8 | 30.9 | 4 | 2,000 |
| 3 | Polyether polyol (PP-2000) | 29.7 | 10.1 | 1 | 2,300 |
| 4 | Polyether polyol (GP-3000) | 25.7 | 12.8 | 1 | 2,200 |
| 5 | Polyether polyol (FA-703) | 65.2 | 25.1 | 1 | 2,400 |

* Those in parenthesis are molecular weights or the names of the sold polyols.

What we claim is:

1. A lignocellulose solution produced by dissolving at least one member selected from the group consisting of cellulose, hemicellulose, lignin and lignocellulose derivatives, in a bio-degradable aliphatic polyester polyol of low molecular weight obtained by a polycondensation of an aliphatic dicarboxylic acid having up to eight carbon atoms and a diol having up to eight carbon atoms.

2. A lignocellulose solution according to claim 1, wherein said lignocellulose is wooden powder, rice bran or straw.

3. A lignocellulose solution according to claim 1, wherein at least one of said lignocellulose derivatives is dissolved and comprises at least one substance obtained by substitution of part of the reactive groups in lignocellulose by at least one organic group selected from the group consisting of aliphatic acyl substituents, dibasic acid monoester substituents, aromatic acyl substituents, lower alkyl substituents, aryl substituents, carboxymethyl substituents, hydroxy alkyl substituents, polyoxyalkylene glycol substituents, benzyl substituents, long chain alkyl substituents, cyanoethyl substituents and methylene ether substituents.

4. A lignocellulose solution according to claim 1, wherein the molecular weight of said aliphatic polyester polyol is within the range of 200 to 5,000.

5. A lignocellulose solution according to claim 1, wherein said lignocellulose solution further contains photodegradation promoter.

6. A lignocellulose solution according to claim 5, wherein said photodegradation promoter is at least one member selected from the group consisting of a condensation product of adol and α-naphthyl amine; acetyl acetone; metallic dialkyl-dithiocarbamate; salicylaldehyde; α-ercaptobenzothiazol; metal salt of fatty acid; thiodipropionic acid; metal acetyl acetonate; α-naphthoquinone; anthraquinone and its derivatives; propiophenone; benzophenone and its derivatives; vinyl-ketone copolymer; and ethylene-carbon monoxide copolymer.

7. A degradable foam produced by foaming and hardening the lignocellulose solution according to claim 1 with a foaming agent selected from solvents of low boiling point and water and a hardening agent selected from the group of compounds consisting of polyhydric isocyanate compounds, polyhydric glycidyl compounds, and melamine derivatives.

8. A method for production of a lignocellulose solution comprising mixing at least one member selected from the group consisting of cellulose, hemicellulose, lignin and lignocellulose derivatives, and a bio-degradable aliphatic polyester polyol of low molecular weight obtained by a polycondensation of an aliphatic dicarboxylic acid having up to eight carbon atoms and a diol having up to eight carbon atoms; and heating the resultant mixture to 100°–300° C. for 0.5 to 5 hours while stirring said mixture.

9. A method according to claim 8, further comprising adding photodegradation promoter to said mixture.

10. A lignocellulose solution produced by dissolving at least one member selected from the group consisting of cellulose, hemicellulose, lignin and lignocellulose derivatives, in a bio-degradable aliphatic polyester polyol of low molecular weight obtained by a polycondensation of a dicarboxylic acid and a diol having up to eight carbon atoms, wherein said dicarboxylic acid is composed of an aliphatic dicarboxylic acid having up to eight carbon atoms and a keto-containing dicarboxylic acid or ester thereof having up to eight carbon atoms.

11. A method for production of a lignocellulose solution comprising mixing at least one member selected from the group consisting of cellulose, hemicellulose, lignin and lignocellulose derivatives, and an aliphatic polyester polyol of low molecular weight obtained by a polycondensation of dicarboxylic acid and a diol having up to eight carbon atoms, wherein said dicarboxylic acid is composed of an aliphatic dicarboxylic acid having up to eight carbon atoms and a keto-containing dicarboxylic acid or ester thereof having up to eight carbon atoms; and heating the resultant mixture to 100–°300 ° C. for 0.5 to 5 hours while stirring.

* * * * *